(No Model.)
W. C. BALL.
REGULATOR FOR TIMEPIECES.
No. 565,955. Patented Aug. 18, 1896.
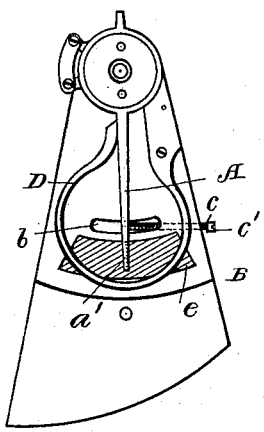
-FIG I-
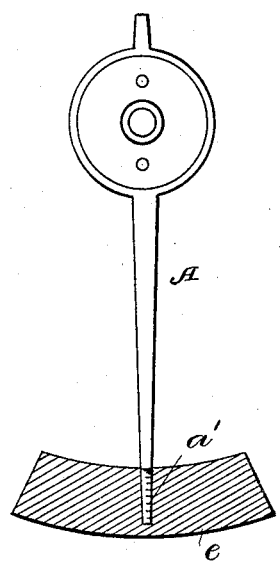
-FIG V-
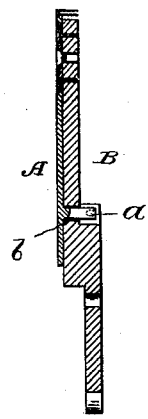
-FIG. III-
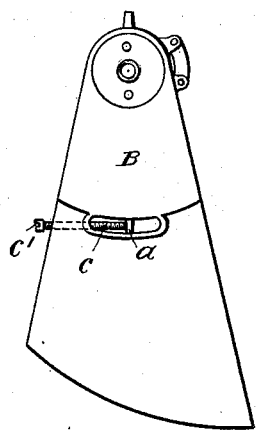
-FIG. II-
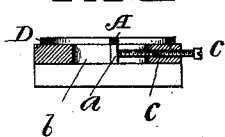
FIG. IV
WITNESSES
J. C. Turner
Wm H Fechur
INVENTOR,
W. C. Ball
By Hall & Fay
Attys.

UNITED STATES PATENT OFFICE.

WEBSTER C. BALL, OF CLEVELAND, OHIO.

REGULATOR FOR TIMEPIECES.

SPECIFICATION forming part of Letters Patent No. 565,955, dated August 18, 1896.

Application filed March 22, 1895. Serial No. 542,759. (No model.)

*To all whom it may concern:*

Be it known that I, WEBSTER C. BALL, a citizen of the United States, and a resident of Cleveland, county of Cuyahoga, and State of Ohio, have invented certain new and useful Improvements in Regulators for Timepieces, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a top plan view of the balance-bridge of a watch, illustrating my improved regulator; Fig. II, a plan view of the under side of the balance-bridge; Fig. III, a longitudinal section of the bridge and regulator; Fig. IV, a transverse section of the same, and Fig. V an enlarged view of the pointer and its scale.

This regulator is particularly designed and adapted for a full-plate watch-movement, and the arrangement of its parts is intended to render the regulator easily accessible for regulation, and at the same time compact, so as not to necessitate an increase of thickness in the watch.

The pointer A of the regulator is of the usual or of any preferred shape and is supported in the usual or in any preferred manner upon the balance-bridge B. A lug $a$ projects downward from the pointer through a segmental slot $b$ in the bridge, which slot is concentric with the center around which the pointer moves. A screw $c$ is threaded through the bridge and has its inner end bearing against the lug upon the pointer. The head $c'$ of the screw is of suitable shape for turning it. A spring D is secured at one end to the face of the bridge, is curved around the free end of the pointer in a wide loop, and has its end bearing against the pointer, near the fulcrum of the same and at the side of the pointer opposite to the screw, so that the spring will force the pointer against the point of the screw. The pointer points to a scale $e$, the lines of which are parallel and oblique to the radial lines at which the pointer may be adjusted, instead of radial to the fulcrum of the pointer, such as they usually are marked in watch-regulators. This arrangement of the lines will admit of a more delicate adjustment of the pointer than the radial marks, as the slightest change of the pointer intersecting the oblique lines will be more clearly noticeable than the change of the pointer nearer to and farther from a radial mark. The end $a'$ of the pointer is preferably beveled to one side and has a number of transverse lines marked upon this bevel. These transverse lines will furthermore increase the delicacy of adjustment for the pointer, as the slightest movement, to one side or the other, of the pointer will change the relative positions of the intersecting lines to a very noticeable extent.

The adjustment of the pointer to either side is accomplished by turning the screw. When the screw is turned to move inward, the pointer will be forced against the tension of the spring, and when the screw is reversed and moved outward the tension of the spring will cause the pointer to move with the screw, keeping the lug in contact with the end of the screw.

Regulators for timepieces have been made with screws for adjusting the pointer and with springs to act in opposition to such screws, but such regulators have had all the adjusting mechanism arranged upon the top of the balance-bridge. This arrangement will not necessitate increased thickness of a watch having more or less open movement and having its balance-wheel at the same level with the remainder of the movement. If employed in a full-plate movement, however, such arrangement would necessitate an increase of space above the balance-bridge, which would materially increase the thickness of the watch and render it impractically thick.

This improvement is designed to enable a screw-adjustment to be employed in a full-plate watch-movement.

Regulators have also been made in which a regulating-screw is journaled in the balance-bridge and has its threads engaged by a lug upon the pointer projecting through a slot in said bridge. If, however, the pointer requires repair in this form of regulator, the entire bridge must be removed from the watch, as the lug upon the pointer cannot be disengaged from the threads of the screw by withdrawing it through the slot.

In my form of regulator the pointer may be removed without disturbing the bridge or the screw in the bridge, as the lug abuts against the end of the screw without any more intimate engagement. This is a feature of great utility, as it is of advantage to be able to repair a part of the mechanism of a watch without being obliged to remove or disturb too many other parts.

Other modes of applying the principle of my invention may be employed for the mode herein explained. Change may therefore be made as regards the mechanism thus disclosed, provided the principles of construction set forth respectively in the following claim are employed.

I therefore particularly point out and distinctly claim as my invention—

In a regulator for timepieces, the combination with a balance-bridge formed with a segmental slot concentric with the pointer-center, said pointer having transverse marks upon its index end, of an index-scale having parallel index-marks oblique to the pointer and to the marks on the end of same, said pointer fulcrumed upon said bridge and provided with a lug projecting into said slot, a spring bearing against the pointer from one side, a screw, threaded into the bridge to project into the end of the slot opposed to the spring and having its inner end bearing against the lug of the pointer, substantially as set forth.

In testimony that I claim the foregoing to be my invention I have hereunto set my hand this 20th day of March, A D. 1895.

WEBSTER C. BALL.

Witnesses:
  WM. SECHER,
  DAVID T. DAVIES.